US012524864B2

(12) United States Patent
Karigiannis et al.

(10) Patent No.: US 12,524,864 B2
(45) Date of Patent: Jan. 13, 2026

(54) COMPONENT ASSESSMENT METHOD AND APPARATUS

(71) Applicant: General Electric Company, Schenectady, NY (US)

(72) Inventors: John Karigiannis, Laval (CA); Shaopeng Liu, Clifton Park, NY (US); James Vradenburg Miller, Clifton Park, NY (US); Peihong Zhu, Clifton Park, NY (US); David Cantin, Sherbrooke (CA); Jonathan R. Hootman, West Chester, OH (US)

(73) Assignee: General Electric Company, Evendale, OH (US)

( * ) Notice: Subject to any disclaimer, the term of this patent is extended or adjusted under 35 U.S.C. 154(b) by 406 days.

(21) Appl. No.: 18/194,109

(22) Filed: Mar. 31, 2023

(65) Prior Publication Data

US 2024/0331128 A1    Oct. 3, 2024

(51) Int. Cl.
*G06N 3/045*        (2023.01)
*G01N 21/91*        (2006.01)
(Continued)

(52) U.S. Cl.
CPC ........... *G06T 7/0004* (2013.01); *G01N 21/91* (2013.01); *G06N 3/045* (2023.01); *G06N 3/0464* (2023.01);
(Continued)

(58) Field of Classification Search
CPC .......... F01D 21/003; F01D 5/005; F01D 5/02; F01D 5/06; F05D 2240/00;
(Continued)

(56) References Cited

U.S. PATENT DOCUMENTS 6,701,615 B2    3/2004   Harding
6,818,459 B2   11/2004   Wack
(Continued)

FOREIGN PATENT DOCUMENTS

DE    102018211212          1/2019
EP       4257803 A1 *     10/2023   ............. F01D 5/005
EP       4517308 A1 *      3/2025   ........... G06T 7/0004

OTHER PUBLICATIONS

Jonas Aust et al., "Automated Defect Detection and Decision-Support in Gas Turbine Blade Inspection," Jan. 26, 2021, Aerospace 2021, 8, 30,pp. 1-19.*

(Continued)

*Primary Examiner* — Omar S Ismail
(74) *Attorney, Agent, or Firm* — Fitch, Even, Tabin & Flannery LLP

(57) ABSTRACT

A control circuit can access inspection results from an inspection of a first component and then input those inspection results to a first machine learning model. The inspection results include potential wear indications. By one approach, that first machine learning model is trained using a training corpus that includes inspection results for previously inspected components that are at least similar to the first component. The first machine learning model can output assessment information that, by one approach, identifies some of the potential wear indications as being relevant. By one approach, the aforementioned assessment information may be input a second machine learning model that is trained using a training corpus that includes historical results from previous inspections of the same first component and wherein the second machine learning model outputs prediction information regarding whether a repeated physical processing of the first component will yield a particular result.

18 Claims, 4 Drawing Sheets

(51) Int. Cl.
*G06N 3/0464* (2023.01)
*G06T 7/00* (2017.01)

(52) U.S. Cl.
CPC .............. *G06T 2207/20081* (2013.01); *G06T 2207/20084* (2013.01); *G06T 2207/30164* (2013.01)

(58) Field of Classification Search
CPC ............ F05D 2240/20; F05D 2250/19; F05D 2250/29; F05D 2260/80; F05D 2260/81; F05D 2260/821; G01N 21/91; G06N 3/02; G06N 3/045; G06N 3/0464; G06N 3/08; G06T 2207/20081; G06T 2207/20084; G06T 2207/30164; G06T 7/0004
See application file for complete search history.

(56) References Cited

U.S. PATENT DOCUMENTS

| | | | |
|---|---|---|---|
| 7,689,003 B2 | 3/2010 | Shannon | |
| 7,918,141 B1 | 4/2011 | Sathish | |
| 8,131,008 B2 | 3/2012 | Thompson | |
| 9,228,958 B2 | 1/2016 | Shirkhodaie | |
| 9,815,166 B2 | 11/2017 | Goldstein | |
| 9,921,132 B2 | 3/2018 | Nissen | |
| 10,082,387 B2 | 9/2018 | Bergren | |
| 10,746,667 B2 | 8/2020 | Bian | |
| 10,753,884 B2 | 8/2020 | Henderkott | |
| 10,943,320 B2 | 3/2021 | Finn | |
| 2017/0370220 A1* | 12/2017 | Morris | F04D 29/542 |
| 2018/0253866 A1* | 9/2018 | Jain | G06F 18/2431 |
| 2019/0338666 A1* | 11/2019 | Finn | G06T 3/4038 |
| 2020/0102827 A1* | 4/2020 | Morris | G06F 30/15 |
| 2020/0141888 A1* | 5/2020 | Bailey | F01D 25/285 |
| 2022/0092856 A1 | 3/2022 | Wu | |
| 2022/0139117 A1* | 5/2022 | Zhang | G05B 23/0283 701/29.4 |
| 2022/0276128 A1* | 9/2022 | Frewen | G01M 15/14 |
| 2022/0327684 A1* | 10/2022 | Cao | G06Q 10/20 |
| 2023/0304476 A1* | 9/2023 | Propheter-Hinckley | G06V 10/751 |
| 2023/0304943 A1* | 9/2023 | Sawyers-Abbott | G01N 21/95 |
| 2023/0313684 A1* | 10/2023 | Augustine | F01D 5/34 29/889.1 |
| 2023/0313685 A1* | 10/2023 | Roberts | F01D 5/005 702/34 |
| 2023/0314116 A1* | 10/2023 | Propheter-Hinckley | G06T 17/00 73/865.8 |
| 2023/0315951 A1* | 10/2023 | Roberts | B23P 6/002 416/134 A |
| 2023/0341356 A1* | 10/2023 | Michaels | F01D 21/003 |

OTHER PUBLICATIONS

Juan Luis Pe'rez-Ruiz et al., "A comparative study of data-driven and physics-based gas turbine fault recognition approaches," Dec. 19, 2020, Proc IMechE Part O: J Risk and Reliability 235(4),pp. 591-605.*

Chun Yui Wong et al., "Automatic Borescope Damage Assessments for Gas Turbine Blades via Deep Learning," Jan. 4, 2021, AIAA SciTech Forum, Jan. 11-15 & 19-21, 2021,pp. 1-13.*

Mahtab Mohtasham Khani et al., "Deep-learning-based crack detection with applications for the structural health monitoring of gas turbines," Nov. 11, 2019, Structural Health Monitoring 19(5),pp. 1440-1450.*

Weizhong Yan, "Detecting Gas Turbine Combustor Anomalies Using Semi-supervised Anomaly Detection with Deep Representation Learning," Dec. 24, 2019, Cognitive Computation (2020) 12,pp. 398-407.*

Miguel A. C. Michalski et al., "Fault Detection and Diagnosis Based on Unsupervised Machine Learning Methods: A Kaplan Turbine Case Study," Dec. 23, 2021, Energies 2022, 15, 80,pp. 1-11.*

* cited by examiner

COMPONENT ASSESSMENT METHOD AND APPARATUS

TECHNICAL FIELD

These teachings relate generally to component assessment and more particularly to determining whether an in-service component can be returned to service.

BACKGROUND

Many apparatuses benefit from inspection of one or more of their constituent in-service components. One salient example in these regards are the spools that are a part of many gas turbine engines. Such inspections can help determine whether a given component can reliably be returned to service (with or without refurbishment), or whether the component should be retired due to in-service wear.

BRIEF DESCRIPTION OF DRAWINGS

The above needs are at least partially met through provision of the component assessment method and apparatus described in the following detailed description, particularly when studied in conjunction with the drawings, wherein.

DETAILED DESCRIPTION

Figure 1:
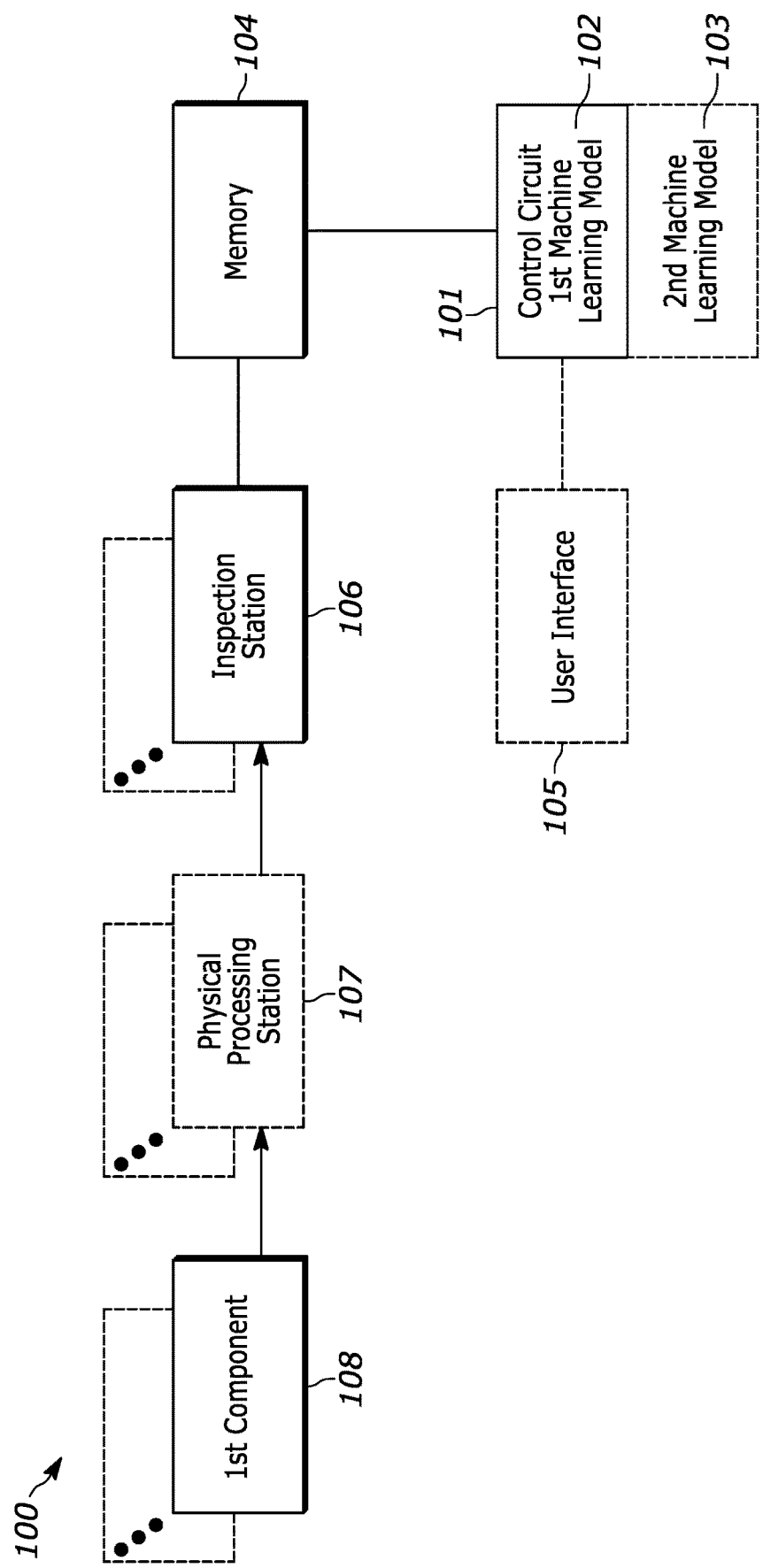
FIG. 1 comprises a block diagram as configured in accordance with various embodiments of these teachings.

Various inspection tools and methods are known in the art. For example, fluorescent penetrant inspection techniques are known. Fluorescent penetrant inspection is a non-destructive testing technique that is used to detect surface-breaking defects in materials, such as metal. The process involves applying a penetrant material to the surface of the object being inspected. The penetrant seeps into cracks, voids, and other surface imperfections. After a sufficient penetration time, the excess penetrant is removed from the surface, and a developer is applied to the object. The developer draws the penetrant back to the surface, forming a visible indication of the defect. The penetrant material is often fluorescent, which, when exposed to ultraviolet light, emits visible light, thereby making the defect indication stand out and easier to see.

"Easier to see," however, does not guarantee being able to successfully ascertain whether a given inspected component is fit to return to service (with or without refurbishment). This is, in particular, a significant challenge in the context of aviation application settings, where an inspected component may be large, complex, expensive, and important to the proper functioning of an aircraft.

Generally speaking, the various aspects of the present disclosure can be employed with a control circuit that is configured to access inspection results (such as inspection results from an inspection of a first component, wherein those inspection results include a plurality of potential wear indications) and then input those inspection results to a first machine learning model. By one approach, that first machine learning model is trained using a training corpus that includes inspection results for previously inspected components that are at least similar to the aforementioned first component. The first machine learning model can output assessment information that, by one approach, identifies some of the potential wear indications as being relevant and some of the potential wear indications as not being relevant.

By one approach, that assessment information informs a determination regarding whether to return the first component to active service.

As one illustrative example, the aforementioned first component may include or be a gas-turbine engine spool.

By one approach, the aforementioned inspection results include, at least in part, fluorescent penetrant inspection results.

By one approach, the aforementioned first component has been used in real-world ordinary course and wherein the aforementioned results are obtained from an inspection of the first component that was preceded by physical processing of the first component. By one approach, that physical processing includes, at least in part, machining the first component.

By one approach the aforementioned inspection results include images. By one approach, the aforementioned first machine learning model includes a convolutional neural network-based model. By one approach, the inspection results for previously inspected components include, at least in part, images that include bounding boxes to identify wear indications, and the assessment information output by the first machine learning model includes, at least in part, images having bounding boxes to identify relevant potential wear indications.

By one approach, the control circuit may be further configured to input at least some of the aforementioned assessment information as output by the first machine learning model to a second machine learning model that is trained using a training corpus that includes historical results from previous inspections of the same first component, and wherein the second machine learning model outputs prediction information regarding whether a repeated physical processing of the first component will yield a particular result. By one approach, the second machine learning model is trained using an image-based annotation, such as, but not limited to, a characterization such as one that represents whether the first component can likely be returned to active service following a repeated physical processing of the first component.

So configured, large, complex, and expensive components can be more reliably assessed and in a typically reduced amount of time as compared to typical prior art approaches in these regards. As a result, such components can be returned to service (with or without refurbishment) or retired from service as appropriate.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

The foregoing and other benefits may become clearer upon making a thorough review and study of the following detailed description. Referring now to the drawings, and in particular to FIG. 1, an illustrative apparatus 100 that is compatible with many of these teachings will first be presented.

This particular example of an illustrative apparatus 100 includes a control circuit 101. Being a "circuit," the control circuit 101 therefore includes structure that includes at least one (and typically many) electrically-conductive paths (such as paths formed of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 101 can include a fixed-purpose, hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can include a partially or wholly-programmable hardware platform (including but not limited to microcontrollers, microprocessors, and the like). These architectural options for such structures are well known and understood in the art and require no further description here. This control circuit 101 is configured (for example, by using corresponding programming as will be well understood by those skilled in the art) to carry out one or more of the steps, actions, and/or functions described herein.

In particular, and as described herein, the control circuit 101 can serve as a first machine learning model 102 (and also, if desired, as an optional second machine learning model 103).

The control circuit 101 operably couples to a memory 104. This memory 104 may be integral to the control circuit 101 or can be physically discrete (in whole or in part) from the control circuit 101 as desired. This memory 104 can also be local with respect to the control circuit 101 (where, for example, both share a common circuit board, chassis, power supply, and/or housing) or can be partially or wholly remote with respect to the control circuit 101 (where, for example, the memory 104 is physically located in another facility, metropolitan area, or even country as compared to the control circuit 101).

In addition to information, such as inspection results that are described herein, this memory 104 can serve, for example, to non-transitorily store the computer instructions that, when executed by the control circuit 101, cause the control circuit 101 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as a dynamic random access memory (DRAM)).

By one optional approach, the control circuit 101 also operably couples to a user interface 105. This user interface 105 can include any of a variety of user-input mechanisms (such as, but not limited to, keyboards and keypads, cursor-control devices, touch-sensitive displays, speech-recognition interfaces, gesture-recognition interfaces, and so forth) and/or user-output mechanisms (such as, but not limited to, visual displays, audio transducers, printers, and so forth) to facilitate receiving information and/or instructions from a user and/or providing information to a user.

In this illustrative example, the apparatus 100 further includes one or more inspection stations 106. When more than one inspection station 106 is available, the stations may be functionally identical to one another or may differ from one another as may best suit the needs of a given application setting. For the sake of an illustrative example, this example presumes that the inspection station 106 includes a fluorescent penetrant inspection station. Other possibilities include stations that provide magnification, that employ high-energy imaging (such as x-ray imaging), and so forth.

By one optional approach, these teachings will accommodate also including one or more physical processing stations 107. Such stations are configured to physically process a component that is to be inspected. As used herein, "physical processing" refers to physically altering a component. Examples include machining (such as milling and/or polishing) a component. Other examples include, but are not limited to, removing and/or reshaping material from a component via light-based approaches, chemical approaches, temperature-based approaches, biological approaches, and so forth as desired. These teachings will also accommodate physically processing a component by adding material to the component (for example, by replacing a part of the component, by welding, and so forth). For the sake of an illustrative example, it is presumed here that the one or more physical processing stations 107 include milling machines.

Also shown in FIG. 1 is a first component 108. This first component 108 can be a component that has been used in service in ordinary course of usage. As will be described below in more detail, this illustrative apparatus 100 serves to inspect the first component 108 for wear and to determine whether the first component 108 can be returned to service (with or without physical processing if desired). For the sake of an illustrative example, it is presumed here that the first component 108 can be a gas-turbine engine spool that has been used on an aircraft inflight for at least a given number of take-off/landing cycles. In this context, a spool can be a rotating structure in a gas-turbine engine. Such spools are typically formed of metal, have precisely-sized and positioned features, and are both heavy and relatively large (for example, about one meter in diameter).

Figure 2:
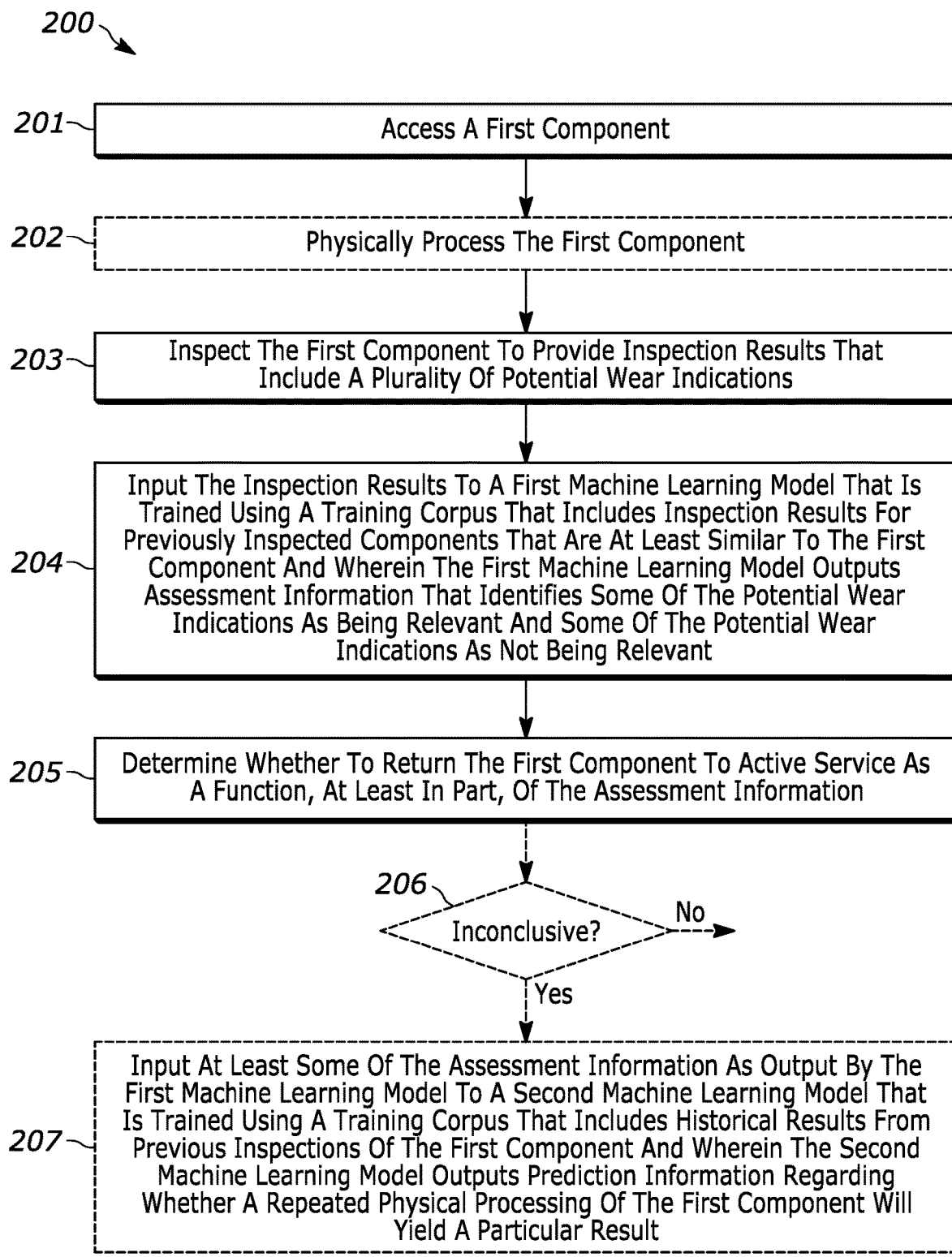
FIG. 2 comprises a flow diagram as configured in accordance with various embodiments of these teachings.

Referring to FIG. 2, a process 200 that can be carried out via the above-described apparatus 100 will now be described.

At block 201, this process 200 provides for accessing a first component 108. As noted above, for the sake of an illustrative example it is presumed here that the first component 108 can be a gas-turbine engine spool. In this example, the spool has been removed from the gas-turbine engine and is no longer located, for example, in situ on an airframe.

At optional block 202, the first component 108 is physically processed (for example, by machining the first component). This physical processing can occur, for example, at the above-described physical processing station 107. In the case of a gas-turbine engine spool, this physical processing can include machining the spool to thereby polish exterior surfaces of the spool.

At block 203, this process 200 provides for inspecting the first component 108 to provide inspection results that include a plurality of potential wear indications. This inspection can be carried out, for example, at the aforementioned inspection station 106. As noted above, this inspection may include fluorescent penetrant inspection. The inspection results may include, at least in part, image-based inspection results. These inspection results may be stored in the above-described memory 104.

At block 204, the above-described control circuit 101 may input those inspection results to a first machine learning model 102. Those skilled in the art understand that machine learning is a branch of artificial intelligence. Machine learning typically employs learning algorithms such as Bayesian networks, decision trees, nearest-neighbor approaches, and so forth, and the process may operate in a supervised or unsupervised manner as desired. Deep learning (also sometimes referred to as hierarchical learning, deep neural learning, or deep structured learning) is a subset of machine learning that employs networks capable of learning (typically supervised, in which the data consists of pairs (such as input_data and labels) and the aim is to learn a mapping between the input_data and the associated labels) from data that may at least initially be unstructured and/or unlabeled. Deep learning architectures include deep neural networks, deep belief networks, recurrent neural networks, and convolutional neural networks. Many machine learning algorithms build a so-called "model" based on sample data, known as training data or a training corpus, in order to make predictions or decisions without being explicitly programmed to do so.

For the sake of an illustrative example, it is presumed here that the first machine learning model 102 includes a convolutional neural network-based model, such as, for example, YOLOv5. Convolutional neural networks are a type of artificial neural network that use a mathematical operation called convolution (in lieu of, for example, general matrix multiplication) in at least one of their layers. Such networks are particularly useful to process pixel data and hence are useful in this illustrative example to process the aforementioned inspection results.

In this illustrative example, the first machine learning model 102 was trained using a training corpus that included inspection results for previously inspected components that are at least similar to the first component 108. Accordingly, one or more of those previously inspected components may also be gas-turbine engine spools having a different size and/or different features than the first component 108 but which are nevertheless of a same categorical type and serve a same operational purpose as the first component 108. These teachings will also accommodate using a training corpus that includes inspection results for at least a predetermined percentage of components that are categorically identical to the first component 108 (such as any percentage between 50% and 100%, including the endpoints).

By one approach, the training corpus includes images from multiple spool components at various inspection stages (including, for example, following physical processing as described herein).

Figure 3:
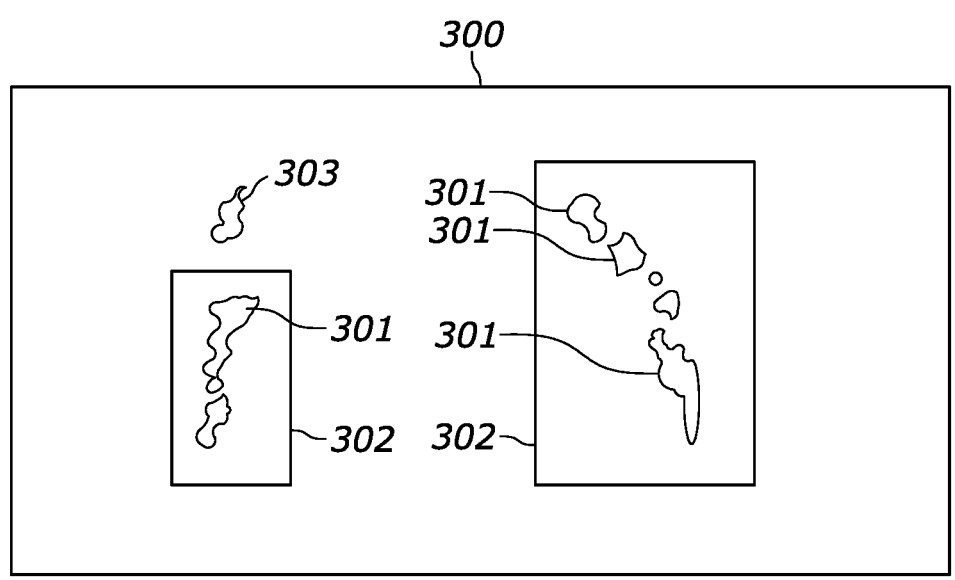
FIG. 3 comprises a screen shot as configured in accordance with various embodiments of these teachings.

With momentary reference to FIG. 3, the training corpus images for the first machine learning model may include one or more images 300 having bounding boxes 302 that identify wear indications 301 of relevance (and where wear indications 303 that are not deemed to be relevant are not so bounded). By one approach, these bounding boxes are provided by a human user. As illustrated, a bounding box 302 can be rectangular in shape. Other shapes can be accommodated, including circles, triangles and other polygons, and any of a variety of other closed or nearly-fully-closed shapes. These bounding boxes 302 can be formed by a color that clearly contrasts with the background of the images 300, and/or may include other highlighting features, such as broken lines. If desired, one version of a bounding box (such as a red-colored bounding box) can serve to indicate a severe wear indication while another version of a bounding box (such as a yellow-colored bounding box) can serve to indicate a less severe wear indication.

Referring again to FIG. 1, so configured, this first machine learning model 102 outputs assessment information that identifies, for example, at least some of the aforementioned potential wear indications as being relevant and some of the potential wear indications as not being relevant when determining whether the first component 108 can be returned to ordinary service (e.g., reinstalled in a gas-turbine engine). By one approach, this assessment information can include, at least in part, the use of bounding boxes to show potential indication locations on a fluorescent penetrant image, and hence offer a visually-keyed differentiation between relevant and irrelevant indications. At least some of this assessment information (such as the potential wear indications identified as being relevant) can be provided to a user via the forementioned user interface 105. The relevancy threshold can be a threshold that is specified by a particular user to accommodate a desired result. That threshold can vary as a function of various influences including manufacturer specifications, user-based specifications, industry-based specifications, government/regulatory specification and requirements, and so forth.

At block 205, with reference again to FIG. 2, these teachings provide for determining whether to return the first component 108 to active service as a function, at least in part, of the aforementioned assessment information. For example, when there are no potential wear indications identified as being relevant, by one approach, the inspected component 108 can be returned to service. By one approach that determination may be partially or wholly automatic.

In some application settings, the foregoing determination may produce an inconclusive result. To accommodate such a situation, at optional block 206 the control circuit 101 determines whether the assessment information yields an inconclusive determination. When the result is conclusive, the process 200 can carry-on as described herein. Upon determining that the assessment information does yield an inconclusive determination, at block 207 the control circuit 101 can input at least some of the assessment information as output by the first machine learning model 102 to a second machine learning model 103.

The second machine learning model 103 may include, for example, a convolutional neural network-based predictor. By one approach, these teachings will accommodate using a residual network type of convolutional neural network architecture. By another approach, these teachings will accommodate using a multilayer perceptron model (which is a supervised learning approach using binary classifiers where typically the perceptron model detects whether any function is an input or not and classifies them in either of the available classes).

The second machine learning model 103 can be trained using a training corpus that includes historical results from previous inspections of the first component 108 itself. By one approach, the training corpus only includes content from previous inspections of the first component 108 itself. The training corpus can optionally also include other content, including historical results from previous inspections of other components that are similar to or identical to the first component 108. This second machine learning model 103 can be trained using image-based annotations, such as characterizations that represent whether the first component 108 can likely be returned to active service following, for example, a repeated physical processing of the first component 108. For example, each training image can have a label indicating the contents of the image as being inconclusive, non-serviceable, or serviceable.

More particularly, training of the second machine learning model 103 can use pairs of indications (i.e., from a same location of the same spool component) from different inspection times between the physical processing activity (for example, an inspection on one date, and then an inspection for the same spool on a later date and after physical processing) but before the spool is returned to service.

Once trained, the second machine learning model 103 can classify/predict the outcome (e.g., serviceable, non-serviceable, or inconclusive) of a given inspection image (with indications) after one more round of physical processing. In particular, the second machine learning model 103 outputs prediction information regarding whether a physical processing of the first component 108 (including a repeated physical processing when the first component 108 was previously physically processed after being accessed and before being inspected as described above) will yield a particular result (such as, that the physical processing will sufficiently improve the first component 108 such that the first component 108 can be conclusively returned to service).

Sans these teachings, a typical application setting may only be able to fully process a single gas-turbine engine spool over the course of one work week. By employing these teachings, that productivity may be doubled or better.

Figure 4:
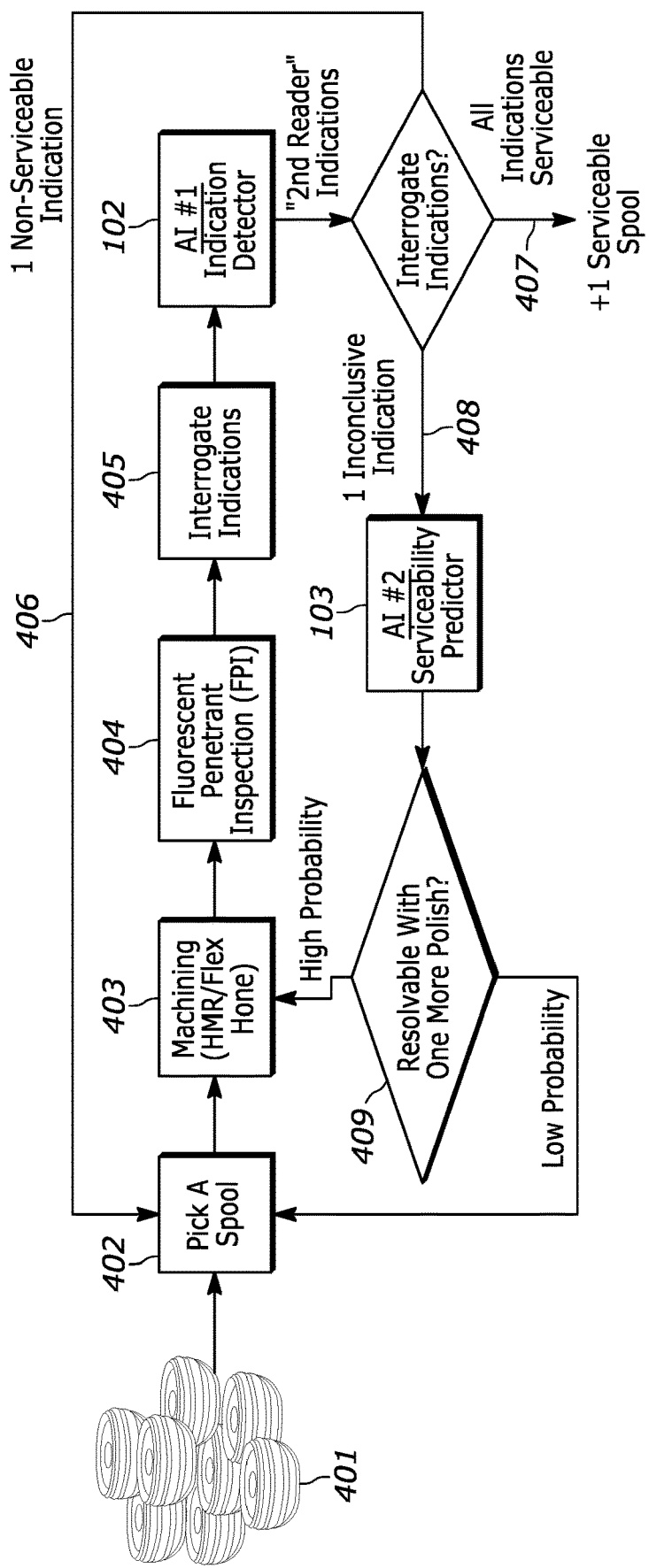
FIG. 4 comprises a flow diagram as configured in accordance with various embodiments of these teachings.

Referring now to FIG. 4, a somewhat more specific example will be provided. It will be understood that the details of this example are intended to serve an illustrative purpose and are not intended to suggest any particular limitations with respect to the scope of these teachings.

At block 402, a particular gas-engine turbine spool 401 is selected. That selection may be based on a first-in/first-out basis or some other prioritized basis (taking into account, for example, some particular need for expediency as regards a particular gas-engine turbine spool 401).

At block 403, the selected spool 401 can be machined using, for example, a high-speed material removal process (such as via a Flex-Hone® tool) to effectively polish surfaces of the spool 401. After this machining step, the machined spool 401 can be inspected at block 404 using, in this example, fluorescent penetrant inspection. Block 405 provides for interrogating the resultant indications from the inspection process followed by detecting such indications using the aforementioned first machine learning model 102.

The latter, in this example, may indicate that the spool 401 has at least one non-serviceable indication. In that case, and as indicated at reference numeral 406, the inspected spool can be removed from service and the process begun anew with a newly-selected spool 401.

Another possibility is that the first machine learning model 102 determines that the inspected spool is serviceable (as denoted by reference numeral 407) and the inspected spool can then be returned to ordinary service (by, for example, reinstalling that spool in the gas-engine turbine from which it was removed or by installing that spool in a different gas-engine turbine).

And as yet another possibility, the first machine learning model 102 might produce an inconclusive indication. As denoted by reference numeral 408, this can lead to the second machine learning model 103 receiving an inconclusive indication and then providing a serviceability predictor that looks to take into account further machining of the spool. Upon determining, at block 409, that there is a high probability (judged, for example, by a threshold of a value that is user selected from the range of 55% to 100%) that the indication at issue can be resolved with one more polishing, the spool can be returned to the machining step 403. The re-polished spool can then be inspected and assessed again as described above. By one approach, such a spool may undergo a series of such machine-and-assess cycles before achieving success or ultimately determining that the spool should be removed from service.

Upon determining, at block 409, that there is a low probability that the indication at issue can be resolved with one more polishing, the spool can be retired and the foregoing process reinitiated by picking another spool at block 402.

Further aspects of the present subject matter are provided by the subject matter of the following clauses:

A method to assess a first component, the method comprising: accessing the first component; inspecting the first component to provide inspection results that include a plurality of potential wear indications; inputting the inspection results to a first machine learning model that is trained using a training corpus that includes inspection results for previously inspected components that are at least similar to the first component by being at least a same categorical type and serving a same operational purpose as the first component, and wherein the first machine learning model outputs assessment information that identifies some of the potential wear indications as being relevant and some of the potential wear indications as not being relevant; and determining whether to return the first component to active service as a function, at least in part, of the assessment information.

Any method clause provided herein, wherein the first component comprises a gas-turbine engine spool.

Any method clause provided herein, wherein inspecting the first component to provide inspection results comprises, at least in part, employing fluorescent penetrant inspection to inspect the first component.

Any method clause provided herein, further comprising, prior to inspecting the first component: physically processing the first component.

Any method clause provided herein, wherein physically processing the first component comprises machining the first component.

Any method clause provided herein, wherein the inspection results include images, the first machine learning model comprises a convolutional neural network-based model, the inspection results for previously inspected components comprise, at least in part, images that include bounding boxes to identify wear indications, and the assessment information output by the first machine learning model comprises, at least in part, images having bounding boxes to identify relevant potential wear indications.

Any method clause provided herein, further comprising: prior to inspecting the first component, physically processing the first component; and when determining whether to return the first component to active service as a function, at least in part, of the assessment information yields an inconclusive determination: inputting at least some of the assessment information as output by the first machine learning model to a second machine learning model that is trained using a training corpus that includes historical results from previous inspections of the first component; and outputting from the second machine learning model prediction information regarding whether a repeated physical processing of the first component will yield a particular result.

Any method clause provided herein, wherein the second machine learning model is trained using image-based annotation.

Any method clause provided herein, wherein the image-based annotation comprises, at least in part, a characterization that represents whether the first component can likely be returned to active service following a repeated physical processing of the first component.

Any method clause provided herein, wherein the second machine learning model is trained using training images having image-based annotations where at least some of the training images have a label indicating that a corresponding item of content of the training image is one of inconclusive, non-serviceable, or serviceable.

An apparatus to assess a first component, the apparatus comprising: a memory having stored therein inspection results from an inspection of the first component, where the inspection results include a plurality of potential wear indications; and a control circuit operably coupled to the memory and configured to: access the inspection results; and input the inspection results to a first machine learning model that is trained using a training corpus that includes inspection results for previously inspected components that are at least similar to the first component and wherein the first machine learning model outputs assessment information that identifies some of the potential wear indications as being relevant and some of the potential wear indications as not being relevant, and wherein the assessment information informs a determination regarding whether to return the first component to active service.

Any apparatus clause provided herein, wherein the first component comprises a gas-turbine engine spool.

Any apparatus clause provided herein, wherein the inspection results comprise, at least in part, fluorescent penetrant inspection results.

Any apparatus clause provided herein, wherein the first component comprises a component that has been used in real-world ordinary course and wherein inspecting the first component was preceded by physical processing of the first component.

Any apparatus clause provided herein, wherein the physical processing of the first component comprises machining the first component.

Any apparatus clause provided herein, wherein the inspection results include images, the first machine learning model comprises a convolutional neural network-based model, the inspection results for previously inspected components comprise, at least in part, images that include bounding boxes to identify wear indications, and the assessment information output by the first machine learning model comprises, at least in part, images having bounding boxes to identify relevant potential wear indications.

Any apparatus clause provided herein, wherein the control circuit is further configured to: input at least some of the assessment information as output by the first machine learning model to a second machine learning model that is trained using a training corpus that includes historical results from previous inspections of the first component; and output from the second machine learning model prediction information regarding whether a repeated physical processing of the first component will yield a particular result.

Any apparatus clause provided herein, wherein the second machine learning model is trained using image-based annotation.

Any apparatus clause provided herein, wherein the image-based annotation comprises, at least in part, a characterization that represents whether the first component can likely be returned to active service following a repeated physical processing of the first component.

Any apparatus clause provided herein, wherein the second machine learning model has been trained using training images having image-based annotations where at least some of the training images have a label indicating that a corresponding item of content of the training image is one of inconclusive, non-serviceable, or serviceable.

Those skilled in the art will recognize that a wide variety of modifications, alterations, and combinations can be made with respect to the above-described embodiments without departing from the scope of the present subject matter, and that such modifications, alterations, and combinations are to be viewed as being within the ambit of the inventive concept.

What is claimed is:

1. A method to assess a first component, the method comprising:
   accessing the first component;
   inspecting the first component to provide inspection results that include a plurality of potential wear indications;
   inputting the inspection results to a first machine learning model that is trained using a training corpus that includes inspection results for previously inspected components that are at least similar to the first component by being at least a same categorical type and serving a same operational purpose as the first component, and wherein the first machine learning model outputs assessment information that identifies some of the potential wear indications as being relevant and some of the potential wear indications as not being relevant; and
   determining whether to return the first component to active service as a function, at least in part, of the assessment information;
wherein the inspection results include images, the first machine learning model comprises a convolutional neural network-based model, the inspection results for previously inspected components comprise, at least in part, images that include bounding boxes to identify wear indications, and the assessment information output by the first machine learning model comprises, at least in part, images having bounding boxes to identify relevant potential wear indications.

2. The method of claim 1, wherein the first component comprises a gas-turbine engine spool.

3. The method of claim 1, wherein inspecting the first component to provide inspection results comprises, at least in part, employing fluorescent penetrant inspection to inspect the first component.

4. The method of claim 1, further comprising, prior to inspecting the first component:
physically processing the first component.

5. The method of claim 4, wherein physically processing the first component comprises machining the first component.

6. A method to assess a first component, the method comprising:
accessing the first component;
prior to inspecting the first component, physically processing the first component;
inspecting the first component to provide inspection results that include a plurality of potential wear indications;
inputting the inspection results to a first machine learning model that is trained using a training corpus that includes inspection results for previously inspected components that are at least similar to the first component by being at least a same categorical type and serving a same operational purpose as the first component, and wherein the first machine learning model outputs assessment information that identifies some of the potential wear indications as being relevant and some of the potential wear indications as not being relevant; and
determining whether to return the first component to active service as a function, at least in part, of the assessment information;
wherein when determining whether to return the first component to active service as a function, at least in part, of the assessment information yields an inconclusive determination:
inputting at least some of the assessment information as output by the first machine learning model to a second machine learning model that is trained using a training corpus that includes historical results from previous inspections of the first component; and
outputting from the second machine learning model prediction information regarding whether a repeated physical processing of the first component will yield a particular result.

7. The method of claim 6, wherein the second machine learning model is trained using image-based annotation.

8. The method of claim 7, wherein the image-based annotation comprises, at least in part, a characterization that represents whether the first component can likely be returned to active service following a repeated physical processing of the first component.

9. The method of claim 7, wherein the second machine learning model is trained using training images having image-based annotations where at least some of the training images have a label indicating that a corresponding item of content of the training image is one of inconclusive, non-serviceable, or serviceable.

10. An apparatus to assess a first component, the apparatus comprising:

a memory having stored therein inspection results from an inspection of the first component, where the inspection results include a plurality of potential wear indications; and
a control circuit operably coupled to the memory and configured to:
access the inspection results; and
input the inspection results to a first machine learning model that is trained using a training corpus that includes inspection results for previously inspected components that are at least similar to the first component and wherein the first machine learning model outputs assessment information that identifies some of the potential wear indications as being relevant and some of the potential wear indications as not being relevant, and
wherein the assessment information informs a determination regarding whether to return the first component to active service;
input at least some of the assessment information as output by the first machine learning model to a second machine learning model that is trained using a training corpus that includes historical results from previous inspections of the first component; and
output from the second machine learning model prediction information regarding whether a repeated physical processing of the first component will yield a particular result.

11. The apparatus of claim 10, wherein the first component comprises a gas-turbine engine spool.

12. The apparatus of claim 10, wherein the inspection results comprise, at least in part, fluorescent penetrant inspection results.

13. The apparatus of claim 10, wherein the first component comprises a component that has been used in real-world ordinary course and wherein inspecting the first component was preceded by physical processing of the first component.

14. The apparatus of claim 13, wherein the physical processing of the first component comprises machining the first component.

15. The apparatus of claim 10, wherein the inspection results include images, the first machine learning model comprises a convolutional neural network-based model, the inspection results for previously inspected components comprise, at least in part, images that include bounding boxes to identify wear indications, and the assessment information output by the first machine learning model comprises, at least in part, images having bounding boxes to identify relevant potential wear indications.

16. The apparatus of claim 10, wherein the second machine learning model is trained using image-based annotation.

17. The apparatus of claim 16, wherein the image-based annotation comprises, at least in part, a characterization that represents whether the first component can likely be returned to active service following a repeated physical processing of the first component.

18. The apparatus of claim 17, wherein the second machine learning model has been trained using training images having image-based annotations where at least some of the training images have a label indicating that a corresponding item of content of the training image is one of inconclusive, non-serviceable, or serviceable.

* * * * *